Figures 1, 2:
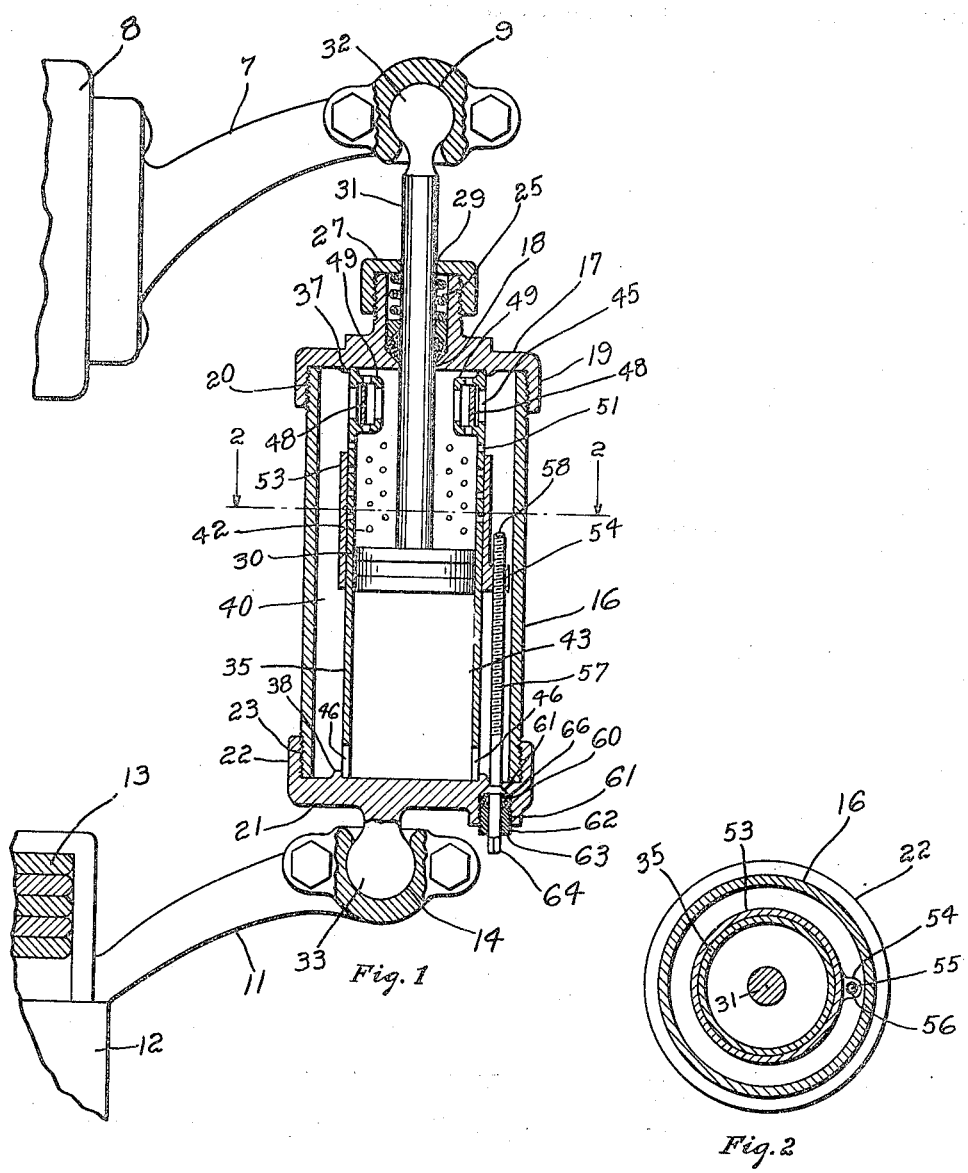

J. F. DUNN
CUSHIONING DEVICE.
APPLICATION FILED NOV. 29, 1919.

1,373,315.

Patented Mar. 29, 1921.

INVENTOR
Joseph F. Dunn
BY
Horatio E. Bellows
ATTORNEY

UNITED STATES PATENT OFFICE.

JOSEPH F. DUNN, OF PROVIDENCE, RHODE ISLAND.

CUSHIONING DEVICE.

1,373,315.  Specification of Letters Patent.  Patented Mar. 29, 1921.

Application filed November 29, 1919. Serial No. 341,432.

*To all whom it may concern:*

Be it known that I, JOSEPH F. DUNN, a citizen of the United States, residing at Providence, in the county of Providence and State of Rhode Island, have invented certain new and useful Improvements in Cushioning Devices, of which the following is a specification.

My invention relates to shock absorbing devices adapted for use upon automobiles and other vehicles.

In spring supported vehicles moving at high speed over rough roads the body has a tendency to bound upwardly and sway whereby the vehicle springs are broken, the wheels raised from the ground, and control of the vehicle lost.

The essential objects of my invention are to yieldingly maintain the body of the vehicle upon or close to the axles whereby the rebound is prevented or minimized, permitting the wheels to hold the road, and more flexible springs to be employed. Further objects are the elimination of noise from the cushioning device; perfect lubrication of the parts thereof eliminating wear and care; noninterference with the downward action of the vehicle springs; to adjustably control and regulate the resistance of the device according to the flexibility of the vehicle springs; to eliminate the jarring and jolting of the suspended mechanism; and to attain these ends in a simple and inexpensive structure.

To the above ends essentially my invention consists in such parts and in such combinations of parts as fall within the scope of the appended claims.

In the accompanying drawings which form a part of this invention

Figure 1 is a vertical central section of my device showing the supports thereof in side elevation partially broken away, and Fig. 2, a transverse section of the same on line 2—2 of Fig. 1.

Like reference characters indicate like parts throughout the views.

My novel device may be mounted in any usual or convenient manner. In the construction illustrated an arm 7 fast to the vehicle body 8 has a spherical cavity or socket 9. A second arm 11 on the axle 12 beneath the spring leaves 13 has a cavity 14 similar to cavity 9 and in vertical alinement therewith.

My cushioning device in its present and preferred form of embodiment comprises an outer cylinder or casing 16 having a plate 17 upon one end provided with a central opening 18, and a peripheral flange 19 threaded as at 20 to the exterior of the casing. A plate 21 closing the other end of the cylinder has a similar flange 22 threaded at 23 thereto. The plate 17, constituting in this instance the top of the casing, is provided with a stuffing box 25 of convenient construction including a cap 27 threaded thereto and provided with an opening 29. A plunger is provided comprising a piston 30 and a piston rod 31. The latter is slidable in the top 17 through the openings 18 and 29 and is provided with a spherical outer end portion 32 loosely seated in the cavity 9. A similar spherical extension 33 of the base or plate 21 is similarly seated in the cavity 14.

A cylinder 35, of less diameter than the casing and concentric therewith has its ends fast to the end plates 17 and 21. The latter are provided respectively with shoulders 37 and 38 abuting against the cylinder. A resultant annular chamber 40 is formed exterior of the cylinder. The piston 30, slidably engaging the cylinder 35, constitutes a partition dividing the interior of the cylinder into two chambers 42 and 43.

The upper and lower ends of the cylinder are each provided with a plurality of annularly arranged openings 45 and 46 respectively. The ports or openings 45 are covered and controlled by valves 48 slidably seated in valve cages 49 upon the inner face of the cylinder. In the cylinder wall intermediate the ports 45 and the plunger head are vertically disposed series of perforations 51. Slidably mounted on the exterior face of the cylinder 35 is a sleeve 53 of sufficient breadth to occlude all the perforations. Upon the lower end of the sleeve is a lug 54 provided with an opening 55 having a thread 56 engaging a thread 57 on a rod 58 rotatably mounted in an opening 60 in the plate 21. In this case the rod has an annular beveled flange 61 in the conical upper portion of the opening 60. The lower cylindrical portion of the opening has a thread 61 engaging an exterior thread 62 upon a tubular plug 63 through which loosely passes an unthreaded portion of the rod 58. The latter projects below the plug and is squared as at 64 to receive a wrench. Packing material 66 is present between the plug and flange 61. The chambers 40, 42 and 43 contain oil.

The parts of my device are shown in neutral position. A down stroke of the plunger, occasioned by a descent of the body 8, forces oil from chamber 43 through openings 46, upwardly in chamber 40, and thence through ports 45 into chamber 42, the valves 48 disclosing the openings 45 under pressure from the chamber 40. An upward movement of the body 8 is limited and a rebound prevents the resistance to the upward movement of the plunger by the oil in chamber 42. The upward movement of the plunger moves the oil to close the ports 45, allowing a limited egress of the oil through the perforations 51 into the chambers 40 and 43. While the descent of the plunger is somewhat resisted and cushioned, it will be noted that its upward movement is resisted in a greater degree. This is because the upward movement of the body 8, or the rebound, is stronger or more violent than its descent.

The degree of resistance to the upward movement of the body and plunger is varied by either raising or lowering the sleeve 53 to open or close a greater number of perforations 51. This is effected by manually rotating the rod 58.

It is to be understood that the invention is not limited to the specific form herein illustrated and described, but may be embodied in other forms without departure from its spirit as defined by the following claims:

As the device may be used in positions other than that shown, the terms upper and lower as employed in the claims are used only relatively, assuming the device to be in the position herein illustrated.

I claim:—

1. In a cushioning device of the character set forth, a casing, a cylinder in the casing spaced therefrom forming an external chamber, said cylinder being provided with openings near one end extending to the chamber, and with perforations near the openings also extending to the chamber, and with openings near the other end extending to the chamber, pressure controlled valves in the cylinder controlling the first mentioned openings, a piston in the cylinder, and a piston rod on the piston extending through one end of the cylinder.

2. In a cushioning device of the character set forth, a casing, a cylinder in the casing concentric therewith and spaced therefrom forming an outer chamber, said cylinder being provided with annularly disposed openings near one end of the cylinder, and with vertically disposed series of perforations disposed between the openings and the other end of the cylinder, and with annularly disposed lateral openings at the other end of the cylinder, both series of openings and the perforations extending to the chamber, vibratory valves in the cylinder controlling the first mentioned openings, a piston in the cylinder, a piston rod on the piston extending through one end of the cylinder, a bearing extension upon the outer end of the rod, and an external bearing extension upon the opposite end of the cylinder.

3. In a cushioning device of the character set forth, the combination of an outer casing, an inner casing concentric therewith and spaced therefrom forming an outer chamber, a piston in the cylinder dividing the cylinder into two internal chambers, a rod on the piston extending through one end of the cylinder, a bearing extension on the free end of the piston rod, said cylinder being provided around the rod with horizontally arranged openings, and with horizontally arranged openings at the other side of the piston, and with vertically arranged perforations intermediate the piston and the first-mentioned openings when the piston is at the lowermost limit of its stroke, whereby the outer chamber communicates with the inner chambers, cages in the cylinder, vibratory valves in the cages registering with the first mentioned openings, and a bearing extension upon the second end of the cylinder.

4. In a cushioning device of the character set forth, a casing, a cylinder in the casing spaced therefrom forming an external chamber, a piston in the cylinder forming a partition between two internal chambers, a piston rod slidably mounted in one end of the cylinder, said cylinder having lateral openings adjacent said end, and provided with perforations between said openings and the lower end of the cylinder, and with lateral openings at the side of the piston opposite the first openings, valves in the cylinder controlling the first mentioned openings, a sleeve slidably mounted upon the cylinder adapted to occlude the perforations, and an operating rod carried by the sleeve.

5. In a cushioning device of the character set forth, a casing, a cylinder in the casing spaced therefrom and having openings at its lower end, a piston slidable in the cylinder, a piston rod carried by the piston, said cylinder being provided with horizontally disposed lateral openings, and with vertically disposed perforations adjacent the last-named openings, valves controlling the openings, a reciprocatory sleeve slidably embracing the cylinder over the perforations, and a rod rotatably mounted in the casing provided with a thread engaging the sleeve.

In testimony whereof I have affixed my signature.

JOSEPH F. DUNN